United States Patent Office 3,479,160 Patented Nov. 18, 1969

3,479,160

METAL PLATING OF PLASTIC MATERIALS

Kenneth A. Klinger, Belpre, Ohio, and John J. Randall and Joseph M. Sakach, Jr., Washington, W. Va., assignors to Borg-Warner Corporation, Chicago, Ill., a corporation of Illinois No Drawing. Filed Oct. 11, 1965, Ser. No. 494,859
Int. Cl. B44c *1/22*
U.S. Cl. 29—195 4 Claims

ABSTRACT OF THE DISCLOSURE

To improve the adhesion between a substrate, which includes an acrylonitrile-butadiene-styrene graft polymer, and a layer of metal electrolytically deposited thereon, the surface of the substrate is treated with methanol.

BACKGROUND AND SUMMARY OF THE INVENTION

In general, this invention relates to the art of metal plating plastic material, and more particularly to an improved surface conditioning process for rendering the surface of the plastic substrate more receptive to the electroless deposition of a metal layer thereon, the electroless coating constituting one of the initial steps in a conventional electrolytic plating process.

In our copending application, Ser. No. 494,861, filed Oct. 11, 1965, a process is described for obtaining superior adhesion in the production of metal plated plastic articles, particularly those molded from resins prepared from acrylonitrile, butadiene, and styrene (hereinafter referred to as ABS), and various blends of such ABS materials with other polymers. The aforementioned application describes in detail a novel surface pre-conditioning step which includes the application of a pre-etch conditioner in the form of a solvent for the particular substrate, said pre-etch conditioner being followed by contact of the surface of said article with a strong oxidizing agent.

The term "ABS solvent" was defined in the aforementioned application as one which readily attacks the surface of the ABS substrate and would produce a cloudy dispersion in the test liquid if the resin is immersed therein for approximately 24 hours. It was further pointed out that of those organic liquids which could be classified as ABS solvents, all of those which were tested for use as a pre-etch conditioner in a plating system produced significant increases in adhesion while those materials which could not be classified as ABS solvents, did not beneficially affect adhesion and in some instances rendered the substrate completely unplateable.

During the testing of said liquids, we discovered that methanol, which is definitely not a solvent for ABS materials, does in fact improve the adhesion to a remarkable degree. Since methanol is relatively inexpensive and commercially available from many sources, a plating system using methanol as the pre-etch conditioner affords many advantages.

It is, therefore, a principal object of the invention to provide a process for improving the adhesion of metal plating onto a plastic material by treating the surface of the molded article to be plated in a bath consisting essentially of methanol, which is inexpensive and readily available as a basic raw material in the chemical industry.

Since the plating and adhesion testing procedures in the examples to be described herein are identical to those described in the aforementioned copending application, much needless repetition can be avoided by referring to various tables and examples in such application which are incorporated in the present specification by reference.

In order to illustrate preferred methods of practicing the invention to those skilled in the art, we have set forth below an example of a process whereby improved adhesion can be obtained in the electroplating of a copper-nickel-chromium layer over a substrate of ABS/ABS-blends which have an intermediate electrolessly deposited copper or nickel layer to provide an electrically conductive surface.

Example

A test plaque of ABS material (Cycolac EP–3510) was molded in accordance with the procedure outlined in our copending application Ser. No. 494,861. The test plaque was then immersed in a bath containing 100% methanol for varying periods of time at different temperatures, removed from the bath, rinsed thoroughly in water, and then placed in a chemical etchant bath having a formula corresponding to Example I in our copending application. After etching for approximately ten minutes at 150° F., the electroless copper was deposited in accordance with the procedure in Table I of our copending application Ser. No. 494,861. After the uniform deposition of electroless copper, the plaque was rinsed and then electroplated in the manner set forth in Table II of said copending application. The adhesion strength of the plated metallic layers to the polymeric substrate was then tested by a variation of ASTM adhesion test D–429–64, Method B, as more particularly described under the heading "Adhesion Testing Techniques" in said patent application Ser. No. 494,861.

In Table I below, the data from a series of tests under varying conditions of time and temperature for the methanol bath is set forth. The adhesion improvement is based on a control sample having adhesion strength of 3.7 pounds per inch. This control sample was plated in the same manner, but the surface pre-treatment consisted of a combined alkali-acid cleaning step in conjunction with the chromate etchant referred to above.

TABLE I

| Surface Conditioner | Treatment Conditions: Percent Concentration | Treatment Conditions: Immersion Time, min. | Treatment Conditions: ° C. Temp. | Adhesion Change Percent From Control | Control, lb./in. | Plaque Adhesion lb./in. |
|---|---|---|---|---|---|---|
| Methanol | 100 | ½ | 30 | 24.4 | 3.7 | 4.6 |
| | 100 | 1 | 30 | 67.5 | 3.7 | 6.2 |
| | 100 | 2 | 30 | 51.5 | 3.7 | 5.6 |
| | 100 | 3 | 30 | 70.4 | 3.7 | 6.3 |
| | 100 | 4 | 30 | 64.9 | 3.7 | 6.1 |
| | 100 | 5 | 30 | 2.7 | 3.7 | 3.8 |
| | 100 | ½ | 40 | 149 | 3.7 | 9.2 |
| | 100 | 1 | 40 | 154 | 3.7 | 9.4 |
| | 100 | 2 | 40 | 181 | 3.7 | 10.4 |
| | 100 | 3 | 40 | 159 | 3.7 | 9.6 |
| | 100 | 4 | 40 | 176 | 3.7 | 10.2 |
| | 100 | 5 | 40 | 187.5 | 3.7 | 10.3 |
| | 100 | ½ | 50 | 357 | 3.7 | 16.9 |
| | 100 | 1 | 50 | 279 | 3.7 | 14.0 |
| | 100 | 2 | 50 | 387 | 3.7 | 18.0 |
| | 100 | 3 | 50 | 387 | 3.7 | 18.0 |
| | 100 | 4 | 50 | 349 | 3.7 | 16.6 |
| | 100 | 5 | 50 | 346 | 3.7 | 16.5 |
| | 100 | ½ | 60 | 336 | 3.7 | 16.1 |
| | 100 | 1 | 60 | 396 | 3.7 | 18.4 |
| | 100 | 2 | 60 | 414 | 3.7 | 19.0 |
| | 100 | 3 | 60 | 460 | 3.7 | 20.8 |
| | 100 | 4 | 60 | 357 | 3.7 | 16.9 |
| | 100 | 5 | 60 | 327 | 3.7 | 15.8 |

While this invention has been described in connection with certain specific examples thereof, it is to be understood that this is by way of illustration and not by way of limitation; and the scope of this invention is defined solely by the appended claims which should be construed as broadly as the prior art will permit.

What is claimed is:

1. A method of improving the adhesion between the surface of an injection molded article and a layer of metal electrolessly deposited thereon, said article being molded from a resin which includes a significant amount of a graft polymer prepared from acrylonitrile, butadiene, and styrene, comprising the steps of treating said surface, prior to depositing said metal layer, with methanol; and thereafter subjecting said surface to an oxidizing agent to promote the activation of bonding sites.

2. A method as defined in claim 1 wherein said article is immersed in a bath of methanol for 1 to 3 minutes, the bath temperature being approximately 60° C.

3. A method of plating an injection molded article, said article being molded from a resin which includes a significant amount of a graft polymer prepared from acrylonitrile, butadiene, and styrene comprising the steps of treating the surface of said part with methanol; treating said surface with a strong oxidizing agent to activate bonding sites on said surface; applying an adherent metallic, electrically conductive layer on said surface by electroless deposition; and thereafter electroplating a metal onto said electrically conductive layer.

4. An injection molded article comprising a substrate consisting essentially of resin including a graft polymer of acrylonitrile prepared from butadiene, and styrene, an electrolessly deposited copper layer on said substrate, an electrolytically deposited copper layer on said electroless copper layer; a nickel layer electrolytically deposited on said copper layer; and a chromium layer electrolytically deposited on said nickel layer, the adhesion strength between said plated layers and said substrate being in excess of fifteen pounds per inch, the surface of said substrate being treated by the conditioning process as defined in claim 2.

References Cited

FOREIGN PATENTS 254,742 5/1963 Australia.

OTHER REFERENCES

Saub estre et al., Plating, October 1965, pp. 982–983.

JOHN H. MACK, Primary Examiner

W. B. VANSISE, Assistant Examiner

U.S. Cl. X.R.

117—47; 156—2; 204—30, 38